United States Patent [19]

Alford

[11] Patent Number: 4,706,224
[45] Date of Patent: Nov. 10, 1987

[54] METHOD OF VERTICAL SEISMIC PROFILING AND EXPLORATION

[75] Inventor: Richard M. Alford, Broken Arrow, Okla.

[73] Assignee: Amoco Corporation, Chicago, Ill.

[21] Appl. No.: 832,570

[22] Filed: Feb. 21, 1986

[51] Int. Cl.$^4$ .......................... G01V 1/00; G01V 1/34; G01V 1/28
[52] U.S. Cl. ........................................ 367/41; 367/75; 364/421
[58] Field of Search ........................ 367/27, 41, 58, 75; 364/421, 422

[56] References Cited

U.S. PATENT DOCUMENTS

| | | | |
|---|---|---|---|
| 3,293,598 | 12/1966 | Brown et al. | 367/41 |
| 4,042,910 | 8/1977 | Rietsch | 367/40 |
| 4,188,610 | 2/1980 | Nelson | 367/42 X |
| 4,300,220 | 11/1981 | Goff et al. | 367/188 |
| 4,450,540 | 5/1984 | Mallet | 367/31 X |
| 4,598,391 | 7/1986 | Muir | 364/421 X |
| 4,648,039 | 3/1987 | Devaney et al. | 364/421 |

FOREIGN PATENT DOCUMENTS 148076 10/1985 European Pat. Off. .

OTHER PUBLICATIONS

Disiena et al., 51st Annual International SEG Meeting, 1981, vol. 4, pp. 1990-2011.
Hardage, "Vertical Seismic Profiling: Part A: Principles," Geophysics Press, 1983, p. 413.
Montmollin, "Three-Component Vertical Seismic Profiling: Geometrical Processing and Wave Indentification", pp. 658-659.

Primary Examiner—Thomas H. Tarcza
Assistant Examiner—Tod R. Swann
Attorney, Agent, or Firm—Timothy D. Stanley

[57] ABSTRACT

The present invention generally relates to a method of seismic exploration. In particular, a novel method of obtaining a vertical seismic profile of the earth's subterranean formation surrounding a well borehole with a horizontally direct swept frequency vibrator and a multicomponent sonde is provided. Additionally, a method is provided to azimuthally align the geophones of the multicomponent sonde having horizontal axes.

22 Claims, 14 Drawing Figures

Z-VERTICAL RESPONSE $[\ T_z(t,z)\ ]$

X–HORIZONTAL RESPONSE $[\ T_x(t,z)\ ]$

Y–HORIZONTAL RESPONSE $[\ T_y(t,z)\ ]$

Z-VERTICAL RESPONSE

ORIENTED $[\ T_z(t,z)\ ]$

X–HORIZONTAL RESPONSE

ORIENTED $\left[ T_x(t,z) \right]$

Y-HORIZONTAL RESPONSE

ORIENTED $[\ T_y(t,z)\ ]$

METHOD OF VERTICAL SEISMIC PROFILING AND EXPLORATION

BACKGROUND OF INVENTION

The present invention generally relates to a method of seismic exploration. In particular, a novel method of obtaining a vertical seismic profile of the earth's subterranean formations surrounding a well borehole is provided.

In vertical seismic profile exploration, seismic energy is periodically imparted into the earth's subterranean formations with a surface source at or near a well borehole. The seismic waves thus generated can be detected along the length of the well borehole with a sonde which develops signals representative of the earth's response to the imparted seismic energy. The response signals can be employed to produce a vertical seismic profile of the earth's subterranean formations surrounding the well borehole.

Various vertical seismic profiling techniques are presently available; however, such techniques have generally been limited to employing compressional wave seismic sources and sondes having vertically oriented geophones to obtain compressional vertical seismic profile data. More recently, DiSiena, et al., 51st Annual International SEG Meeting (1981) V. 4 pages 1990-2011, have developed a vertical seismic profiling technique employing impulsive seismic sources, which impart both shear wave and compressional wave seismic energy, e.g., a Dinoseis (a trademark of ARCO Oil and Gas Company) source, and a sonde having three component geophones adapted to detect motion along vertical (z) and horizontal (x-y) axes to conduct vertical seismic profile exploration. In such case, shear wave and compressional wave vertical seismic profile data can be obtained for the formations surrounding the well borehole from the imparted shear and compressional wave seismic energy, i.e., each vertical seismic profile display includes both shear wave and compressional wave responses of the earth. Others, such as Devaney, et al., European Patent Application No. 148,076, have disclosed a vertical seismic profiling technique wherein the compressional and shear components can be related analytically to the imparted wavefield using a sonde with at least two geophones both aligned in the source-borehole plane, more precisely the plane defined by the source and the well borehole axis, and certain knowledge of the acoustic properties of the formation surrounding the well borehole. Still others, such as Hardage, "Vertical Seismic Profiling: Part A: Principles," Geophysical Press, 1983, page 413, have proposed separating the compressional and shear components of a measured wavefield by the expedient of mathematical rotations. However, in locales having complex subsurface formations where converted modes of seismic energy can be present, it is believed such techniques will not reliably separate the compressional and shear components of the wavefield. Whereas, the present invention is directed to a method of vertical seismic profiling to excite and extract both compressional and shear seismic responses of the earth's formations utilizing a horizontally directed swept frequency vibrator and a multicomponent sonde.

SUMMARY OF THE INVENTION

The present invention is directed to a novel method of vertical seismic profiling and exploration of the earth's subterranean formations surrounding a well borehole.

In conducting vertical seismic profile exploration, seismic energy is periodically imparted into the earth's subterranean formations with a horizontally directed swept frequency vibrator while a multicomponent sonde is traversing a region of interest in the well borehole. The horizontally directed swept frequency vibrator (HDSFV) sweeps through a predetermined range of frequencies in accordance with a pilot sweep signal. The multicomponent sonde has three geophones or detectors with linearly independent lines of response or axes. The geophones of the multicomponent sonde each develop raw response signals representative of the earth's response to the imparted seismic energy projected upon their respective axes.

By cross-correlating the raw response signals with a fundamental harmonic of the pilot sweep signal, a plurality of first signals representing a first measure of the earth's response to the periodically imparted seismic energy can be developed. Additionally, by cross-correlating the raw response signals with a second harmonic of the pilot sweep signal, a plurality of second signals representing a second measure of the earth's response to the periodically imparted seismic energy can be developed. It has been found that the first signals correspond to the earth's response to the horizontal motion of the HDSFV which accentuates the shear component of the earth's response to the imparted seismic energy. It has been found that the second signals correspond to the earth's response to the vertical motion of the HDSFV which accentuates the compressional component of the earth's response to the imparted seismic energy.

As the sonde is moved from one location to another in the borehole, the sonde is free to twist on a cable that suspends it in the well borehole. The resulting random twisting and turning of the multicomponent sonde causes the geophones having nonvertical axes to rotate about the vertical axis of the cable and produce distorted information because of the uncertainty of the azimuthal orientation of such geophones at various detection locations within the well borehole. It has also been found that the second signals can be used to determine the azimuthal orientation of the sonde, so as to correct for the random twisting and turning of the multicomponent sonde as it traverses a region of interest in the well borehole. Present sondes can include an azimuthal orientation measuring device, such as one or more magnetometers, to measure azimuth from magnetic north which provides the information to computationally unravel the random twisting and turning such that it appears as if the multicomponent sonde did not rotate about the vertical axis of the well borehole as it is moved from one location to another.

DESCRIPTION OF THE PREFERRED EMBODIMENT

The present invention relates to a method of seismic exploration. More particularly, a novel method of conducting vertical seismic profiling (VSP) of the earth's subterranean formations surrounding a well borehole is disclosed.

Figure 1:
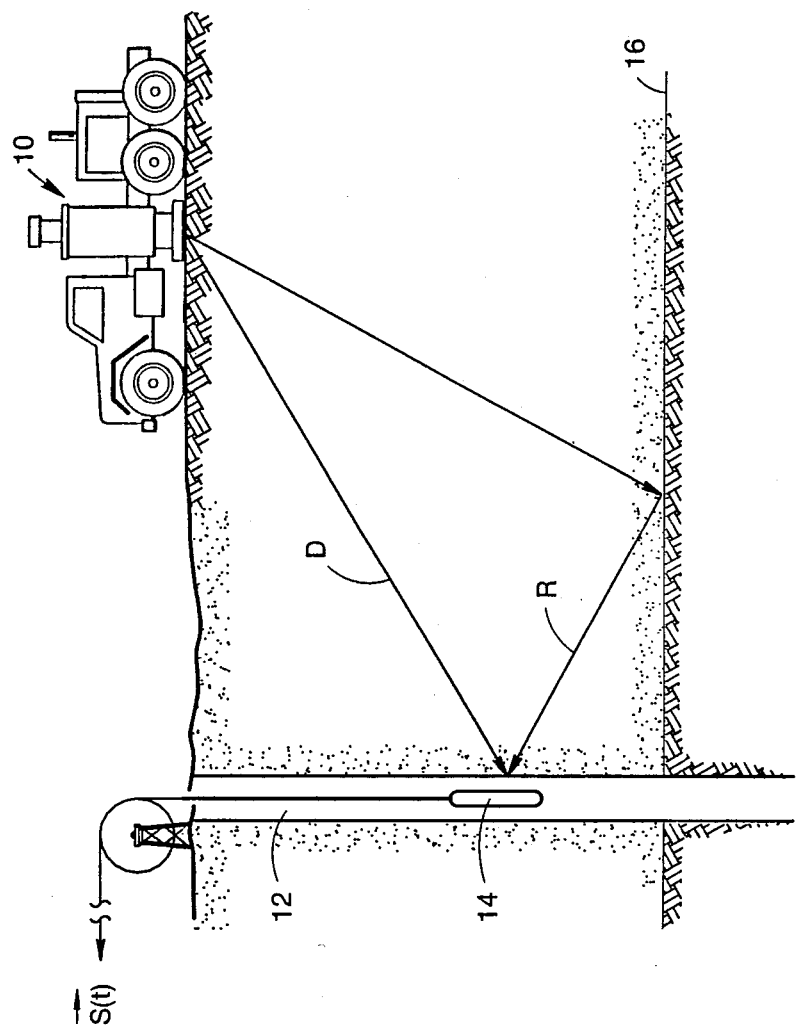
FIG. 1 is a schematic representation of the vertical seismic profile and exploration technique.

Looking first to FIG. 1, the VSP technique of the present invention includes periodically imparting seismic energy into the earth's subterranean formations with a horizontally directed swept frequency vibrator (HDSFV) 10, e.g., a vibroseis-type shear wave vibrator, a selected distance from a well borehole 12. The vibrator 10 sweeps a range of frequencies in accordance with a pilot sweep signal f(t). By way of example, the pilot sweep signal f(t) can be a linear sweep from 7–47 Hz. The horizontally directed swept frequency vibrator 10 is designed to optimize the generation of horizontal seismic energy, which when viewed at the point of coupling of the vibrator 10 to the earth's surface is the result of source motion along a horizontal axis. The seismic energy propagates into the earth's subterranean formation beneath the vibrator 10 principally as transverse or shear wave energy in response to the imparted horizontal motion. The introduced nomenclature of the horizontally directed swept frequency vibrator has been established as a substitute for the more conventional identification of such swept frequency vibrator 10, i.e., "shear wave vibrator," since it is the direction of motion of certain harmonics of the HDSFV 10 that are of interest.

Regardless of the optimized design output of the horizontally directed swept frequency vibrator 10, it has also been found that vertical seismic energy is also developed by the horizontally directed swept frequency vibrator 10. Moreover, the vertical energy is at the second harmonic of the pilot sweep signal f(t) and thus is substantially orthogonal in time to the fundamental harmonic of the pilot sweep signal f(t). The vertical energy, when viewed from the point of coupling of the vibrator 10 to the earth's surface, is the result of source motion along a vertical axis. This vertical seismic energy propagates into the earth's formations beneath the vibrator 10 principally as compressional energy, in response to the imparted vertical motion.

The earth's response to the imparted seismic energy (both horizontal and vertical) periodically imparted by the horizontally directed swept frequency vibrator 10, a spaced distance from the well borehole 12 is detected by a multicomponent sonde 14 at selected locations as it traverses the well borehole 12. The multicomponent sonde 14 detects both direct arrivals D and reflections R of the imparted seismic energy. Unexpectedly, the earth's response to the imparted vertical horizontal motion can be extracted from raw response signals developed by the multicomponent sonde 14, as a consequence of the substantial orthogonality of the fundamental and second harmonics of the pilot sweep signal f(t), so as to provide measures of both the shear and compressional responses of the formations surrounding the well borehole. Moreover, it has been found that the earth's response to the imparted vertical motion developed by the HDSFV 10 and detected by the multicomponent sonde 14 can be used to determine the azimuthal orientation of the multicomponent sonde 14 as it traverses the well borehole 12 without a need to resort to the use of magnetometers to measure azimuthal variations of the multicomponent sonde 14 from magnetic North.

Figure 2:
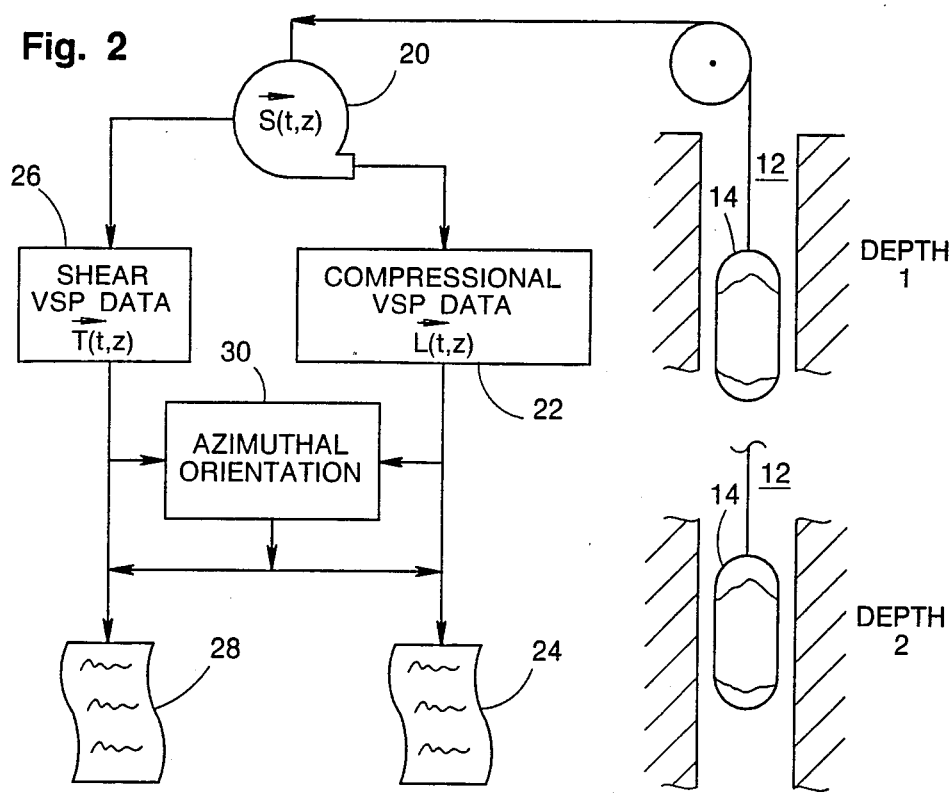
FIG. 2 is a schematic representation of the present invention.

Looking next to FIG. 2, the multicomponent sonde 14 is shown suspended at two different depths (1, 2) within the well borehole 12. Multicomponent sonde 14 comprises three geophones having linearly independent lines of action or axes. For example, the geophones of the multicomponent sonde 14 can form an orthogonal arrangement where a vertical geophone has an axis along the vertical axis of the well borehole and two horizontal geophones have orthogonal axes in the horizontal plane, or the geophones can be spaced relative to each other at some other angle; e.g., 54°. Typically, the geophones are designed to exhibit closely matched phase and amplitude responses. The multicomponent sonde 14 is designed to press against the wall of the well borehole 12 at selected acquisition points to ensure mechanical coupling of the sonde 14 and the geophones to the formation. A plurality of raw response signals representative of the earth's response to the periodically imparted seismic energy are developed by the geophones of the multicomponent sonde 14 as it traverses a region of interest in the well borehole 12.

Figure 2A:
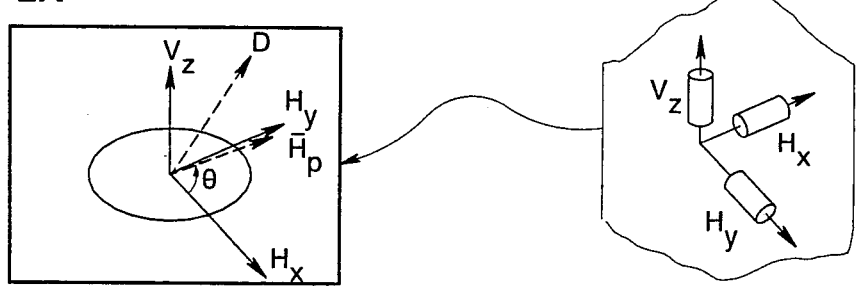
FIGS. 2A and 2B are representations of the orientation of the horizontal geophones of the multicomponent sonde shown at two depths in FIG. 2.
Figure 2B:
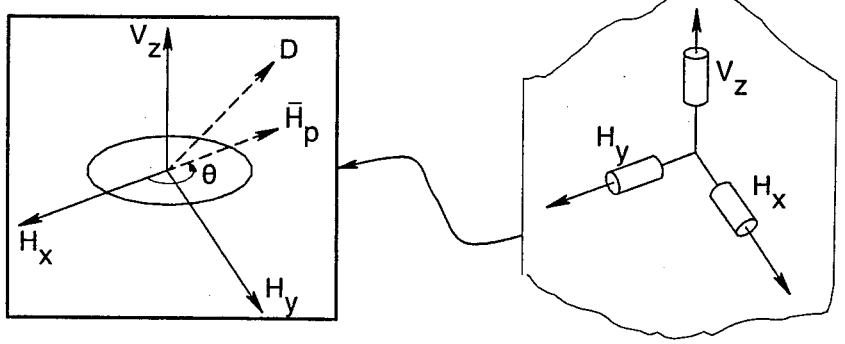

In the preferred embodiment, one of the geophones $V_z$ has an axis substantially parallel to the vertical axis of the well borehole while the two other geophones, $H_x$ and $H_y$, have axes substantially in a horizontal plane. More particularly, the axes of the geophones can form an orthogonal xyz coordinate system as depicted in FIGS. 2A and 2B. As the multicomponent sonde 14 traverses a region of interest in the well borehole 12 it twists and randomly orients the geophones having horizontal lines of response or axes as graphically indicated by the axes of the horizontal geophones at the two different depths (1,2) in FIGS. 2A and 2B. However, the line of response or axis of the vertical phone $V_z$ remains unchanged as the multicomponent sonde 14 twists and randomly orientates the lines of response of the horizontal geophones ($H_x$, $H_y$).

The geophones of the multicomponent sonde 14 develop raw response signal $\overline{S}(t,z)$, as a result of imparted seismic energy at selected depths z within the well borehole 12. The raw response signal $\overline{S}(t,z)$ includes three separate response signals developed by the three geophones, i.e., $V_z(t,z)$, $\underline{H}_x(t,z)$ and $H_y(t,z)$, which form the raw response signal $\overline{S}(t,z)$ at 20. Signals representative of a measure of the earth's compressional response to the imparted seismic energy, $\overline{L}(t,z)$, can be extracted from the raw response signals $\overline{S}(t,z)$ at 22, as will be more fully discussed below, from which compressional VSP displays can be obtained at 24. Signals representative of a measure of the earth's shear response to the imparted seismic energy, $\overline{T}(t,z)$, can also be extracted from the raw response signals $\overline{S}(t,z)$ at 26 and as will be more fully discussed below from which shear VSP displays can be obtained at 28.

Because the direction of the axes of the horizontal geophones ($H_x, H_y$) can randomly twist and turn as the multicomponent sonde 14 traverses the well borehole 12, it is necessary to correct their response signals for azimuthal orientation, to produce or synthesize at 30 response signals that would have been developed by the horizontal geophones ($H_x, H_y$) in response to the imparted seismic energy if the random twisting and turning had not occurred. Such correction is necessary before meaningful information can be obtained from the response signals developed by the horizontal geophones ($H_x, H_y$). Consequently, the response signals $\vec{L}(t,z)$ and $\vec{T}(t,z)$ can be corrected for such random twisting and turning at 30 and plotted as VSP displays at 24 and 28.

Looking again at FIGS. 2A and 2B, which correspond to the depths 1 and 2 of multicomponent sonde 14 in the well borehole 12 of FIG. 2, the differences in azimuthal orientation of the horizontal geophones ($H_x, H_y$) resulting from the random twisting and turning of the multicomponent sonde 14 can clearly be seen. Moreover, one can assume that direct arrivals D of the seismic energy propagate in a vertical plane containing the multicomponent sonde 14 and the horizontally directed swept frequency vibrator 10. In particular, for the compressional component of the earth's response to the imparted seismic energy, the particle motion can be assumed to be contained in this plane. However, for the shear component of the earth's response to the imparted seismic wave energy, there is no appropriate assumption for the direction of the particle motion, as is well known to those skilled in the art.

A horizontal projection ($\overline{Hp}$) of the signal $\vec{L}(t,z)$ representative of the compressional component of the earth's response to the imparted seismic energy can be obtained for a direct arrival D of the seismic energy at the multicomponent sonde 14. Importantly, the horizontal projection ($\overline{Hp}$) can be assumed to lie in the vertical plane containing the multicomponent sonde 14 and the horizontally directed swept frequency vibrator 10. The horizontal projection ($\overline{Hp}$) of the signal $\vec{L}(t,z)$ representative of the compressional component also corresponds to a vector sum of the compressional components of the earth's response to the imparted seismic energy as represented by the compressional response signals developed by the horizontal geophones ($H_x, H_y$) This result will be more fully discussed below. Since the direction of the horizontal projection ($\overline{Hp}$) is fixed, it can therefore be employed as a fixed reference frame with which to sort out the twisting and random azimuthal orientation of the axes of the horizontal geophones. As will be shown below, the response signals developed by the horizontal geophones ($H_x, H_y$) can be corrected for azimuthal orientation at 30.

Thus, the present invention provides a novel method for directly obtaining both shear and compressional VSP data employing a horizontally directed swept frequency vibrator 10 and a multicomponent sonde 14 having three geophones with linearly independent axes in a single traverse of the well borehole 12. Additionally, the axes of the horizontal geophones of the multicomponent sonde 14 can be azimuthally oriented with respect to a fixed reference frame employing independent information obtained from the earth's compressional wave response to the imparted seismic energy.

Figure 3:
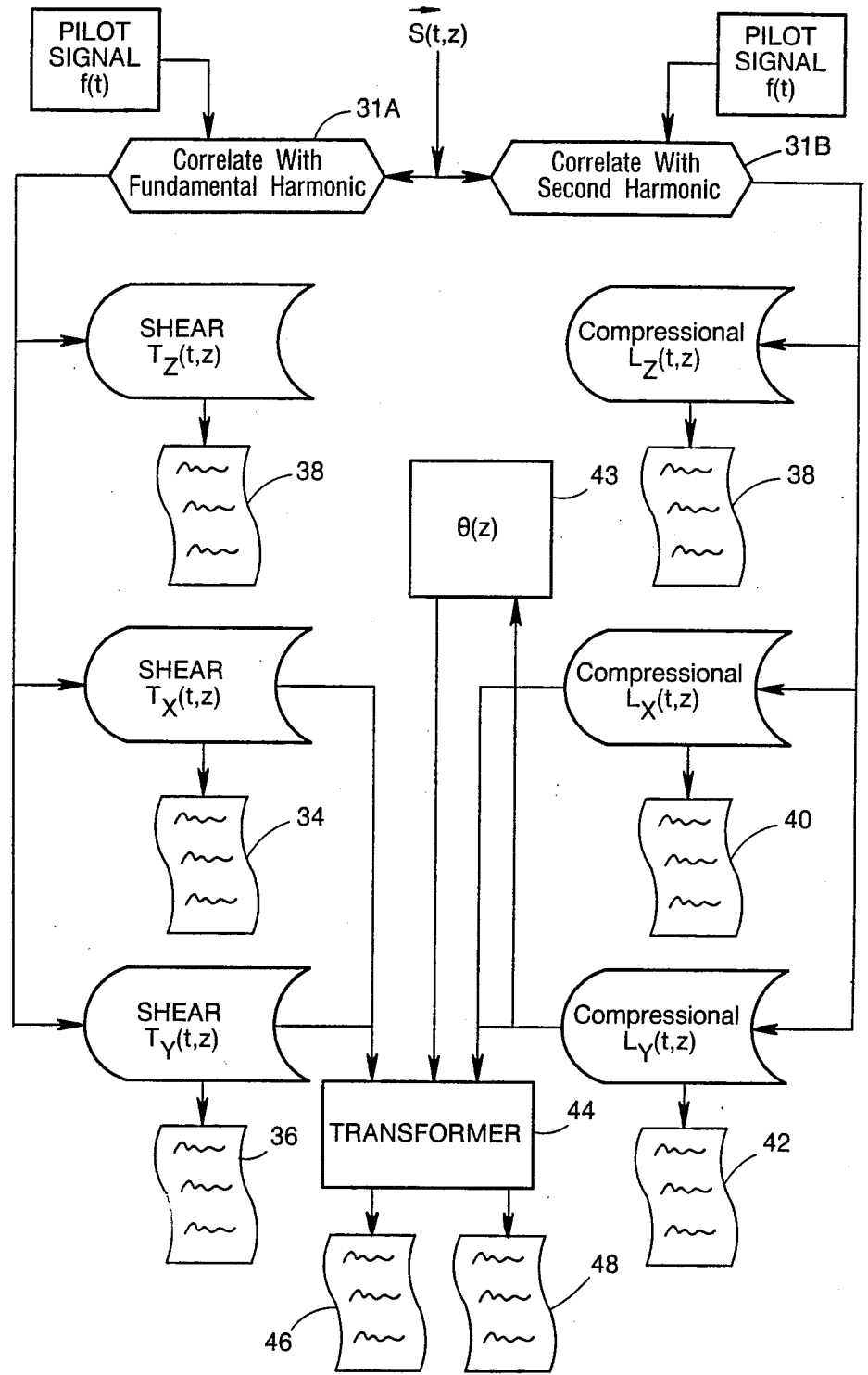
FIG. 3 is a schematic representation of the process of the present invention.

Referring now to FIG. 3, the steps employed to extract both the shear and compressional VSP data from the raw response signals $\vec{S}(t,z)$ resulting from seismic energy imparted by the horizontally directed vibrator 10 according to a pilot sweep signal, f(t), e.g., a linear sweep of 7–47 Hz. Recall also that the raw response signals $\vec{S}(t,z)$ represent the earth's response as a function of time at a selected depth z within the well borehole 12, to the seismic energy imparted by horizontally directed swept frequency vibrator 10 of FIG. 1.

Figure 4A:
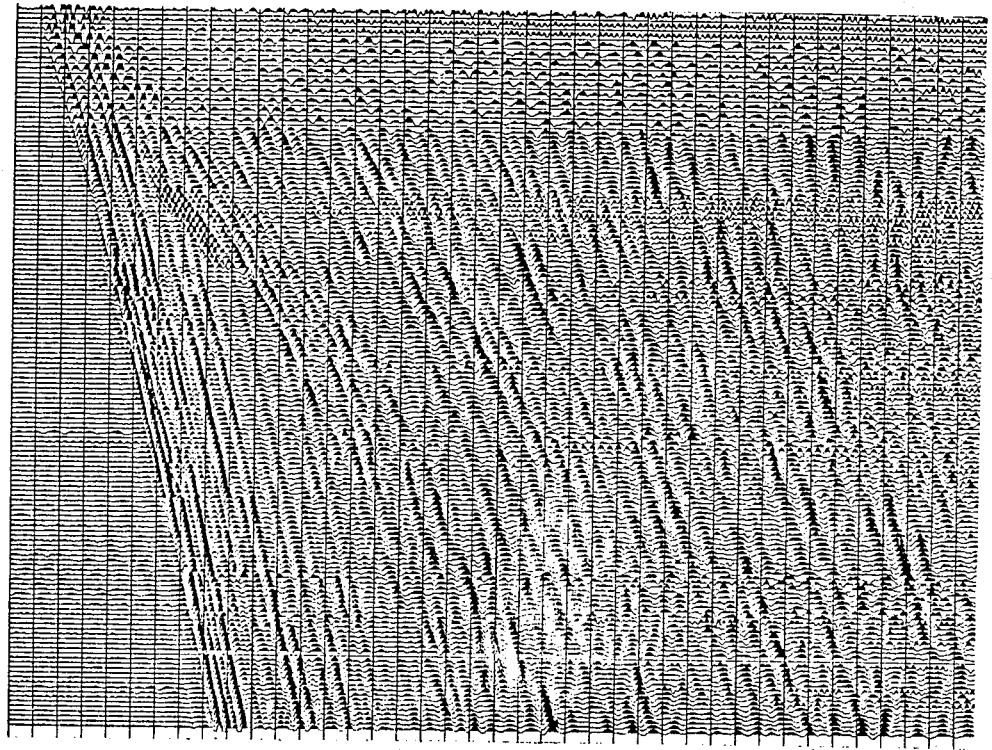
FIGS. 4A, B, and C are representations of the earth's shear wave response to the imparted seismic energy developed by the multicomponent sonde.
Figure 4B:
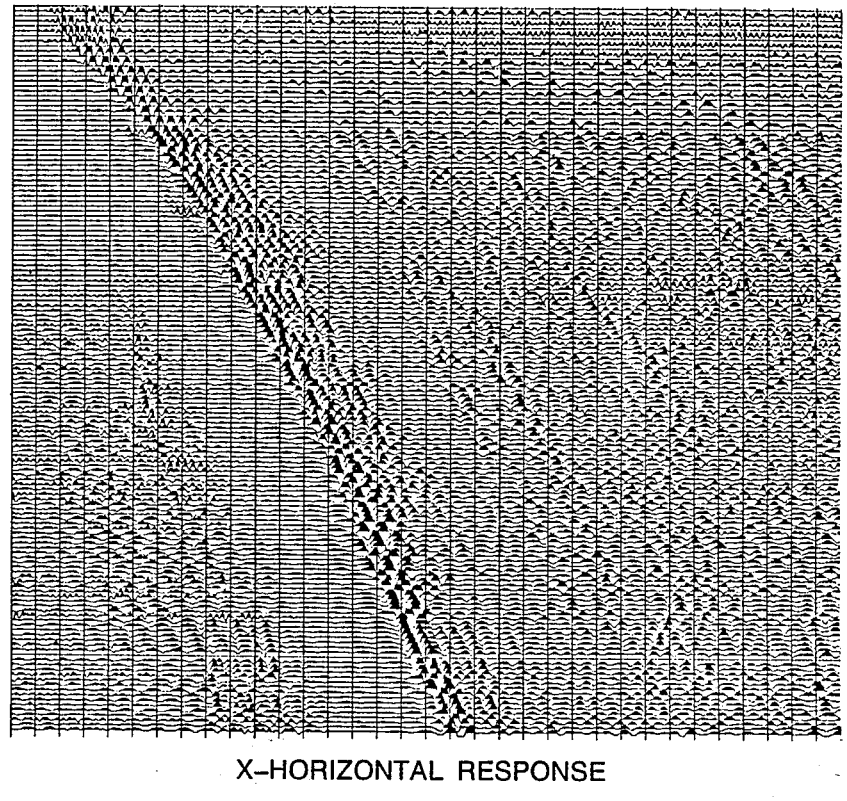
Figure 4C:
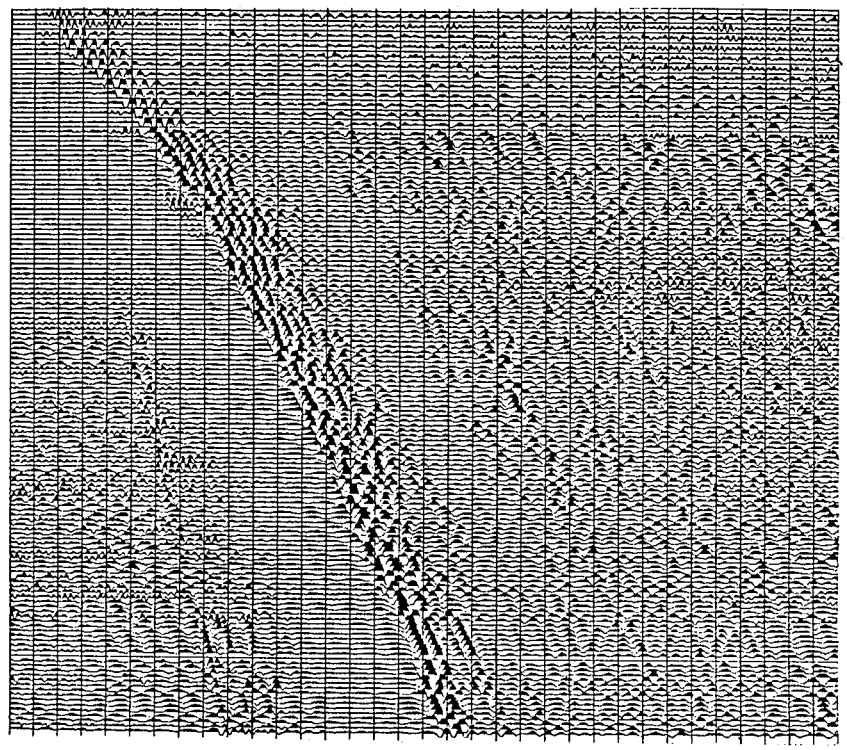

Those skilled in the art appreciate that various well-known techniques are available for cross-correlation. As a result of cross-correlating a fundamental harmonic of the pilot sweep signal f(t), e.g., a linear sweep of 7–47 Hz, with the raw response signals $\vec{S}(t,z)$ developed by the vertical ($V_z$) and horizontal ($H_x$, $H_y$) geophones at 31a, first response signals $T_z(t,z)$, $T_x(t,z)$ and $T_y(t,z)$ can be developed from which intermediate shear VSP displays 32, 34, and 36, respectively, can be obtained and which are shown more completely in FIGS. 4A, B, and C. FIGS. 4A, B, and C represent actual shear VSP data in accordance with the present invention. In this case, shear wave particle motion is generally confined to planes defined by the axes $H_x$ and $H_y$. Hence, interpretable shear VSP data will be contained primarily in the horizontal geophones first response signals, i.e., $T_x(t,z)$ and $T_y(t,z)$. In fact, both direct shear events and reflected shear events are apparent in FIGS. 4A, 4B and 4C. However, the shear events in FIG. 4A are extremely weak, indicating that very little of the shear component of the earth's response to the imparted seismic energy is detected by the vertical phone $V_z$ as a result of acquisition geometry, i.e., source-sonde relative position. The ambiguous orientation of the axes of the horizontal geophones is evidenced by the discontinuous and jagged nature of the shear events in FIGS. 4B and C.

Figure 5A:
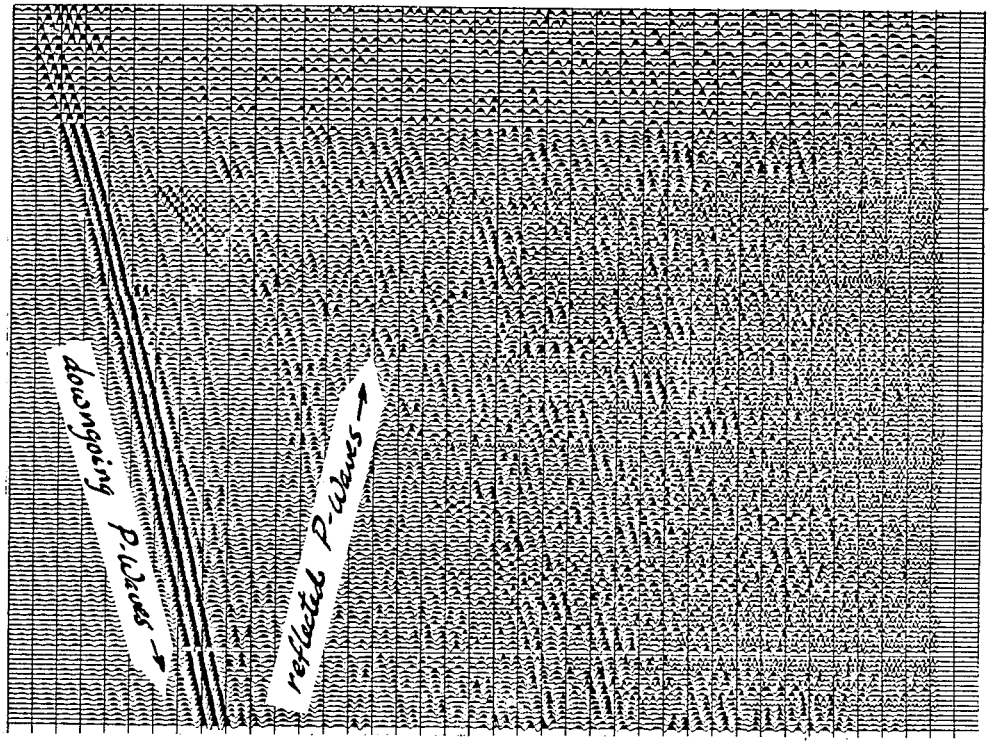
FIGS. 5A, B, and C are signals representations of the earth's compressional wave response to the imparted seismic energy developed by the multicomponent sonde.
Figure 5B:
Figure 5C:
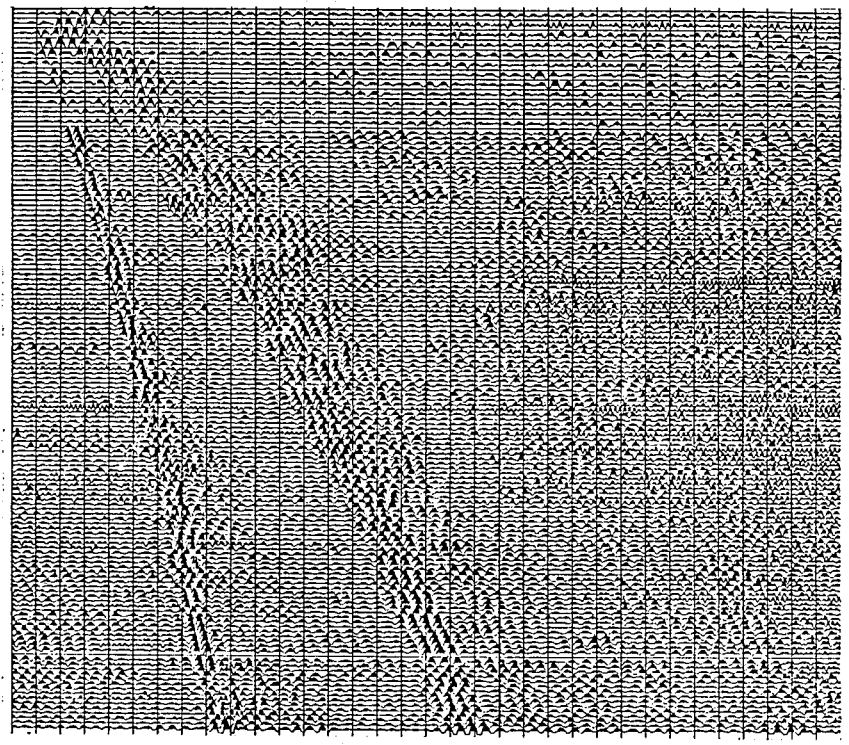

Additionally, it has been found that if the raw response signals $\vec{S}(t,z)$ of the vertical and horizontal geophones are cross-correlated with a second harmonic of the pilot sweep signal f(t), e.g., a linear sweep of 14–94 Hz, at 31b second response signals $L_z(t,z)$, $L_x(t,z)$ and $L_y(t,z)$ representative of the earth's compressional response to seismic energy imparted from the horizontally directed vibrator 10 can be developed from which compressional VSP displays 38, 40 and 42, respectively, can be obtained and which are shown more completely in FIGS. 5A, 5B and 5C. FIGS. 5A, 5B and 5C were obtained from the same raw response signals $\vec{S}(t,z)$ as employed in FIG. 4 above. Direct compressional events and reflected compressional events are labeled in FIG. 5A. In this case, the compressional wave particle motion is generally parallel to the axis of $V_z$. Hence, the interpretable compressional VSP data will be contained primarily in the second response signal $L_z(t,z)$. Additionally, the compressional events in FIGS. 5B and C are weak, indicating that very little of the compressional component of the earth's response to the imparted seismic energy is detected by the horizontal geophones ($H_x$, $H_y$) and contained in the second signals $L_x(t,z)$ and $L_y(t,z)$ as a result of acquisition geometry.

By vectorially summing the second response signals $L_x(t,z)$ and $L_y(t,z)$, a direction vector ($\overline{Hp}$) can be obtained which corresponds to the horizontal projection of a direct arrival D of the earth's compressional response signal $\vec{L}(t,z)$ to the imparted seismic energy, as seen in FIGS. 2A and 2B. The direction vector ($\overline{Hp}$) points in the direction from which the seismic energy emanates from the vibrator 10 to the well borehole 12. The direction vector ($\overline{Hp}$) can thus be employed as a fixed reference frame with which to orient the response signals $T_x(t,z)$ and $T_y(t,z)$ and $L_x(t,z)$ and $L_y(t,z)$ and to determine an angle $\theta(z)$ between the direction vector ($\overline{Hp}$) and the axis of one of the horizontal geophones.

The angle $\theta(z)$ can be employed so as to rotate the horizontal geophone axes to a fixed reference frame so as to unravel the random azimuthal orientation of the axes of the horizontal geophones as the multicomponent sonde 14 traverses the length of the well borehole.

Exemplary of the rotation transformation to correct for the random azimuthal orientation of the multicomponent sonde 14 as it traverses the well borehole 12, a vector solution is provided below:

A response signal $\vec{L}(t,z)$ having components $L_z(t,z)$, $L_x(t,z)$ and $L_y(t,z)$ can be represented as:

$$\vec{L}(t,z) = L_z(t,z)\vec{z} + L_x(t,z)\vec{x} + L_y(t,z)\vec{y} \tag{1}$$

where $L_z(t,z)$ = a response signal developed by a geophone having a vertical axis z;

$L_x(t,z)$ = a response signal developed by a geophone having a horizontal axis x; and $L_y(t,z)$ = a response signal developed by a geophone having a horizontal axis y.

The time $t_o$ of the maximum projected resultant in the x-y plane within a specified time window $(t_1 \to t_2)$ is:

$$R(t_o,z) = \max_{t_1 < t < t_2} [L_x^2(t,z) + L_y^2(t,z)]^{\frac{1}{2}} \tag{2}$$

for which a rotation angle $\theta(z)$ can be defined as:

$$\theta(z) = \tan^{-1} \frac{L_y(t_o,z)}{L_x(t_o,z)}. \tag{3}$$

Consequently, the rotation transformation of the original component signals is:

$$\lambda_x(t,z) = \pm(L_x(t,z) \cos \theta(z) + L_y(t,z) \sin \theta(z)) \tag{4a}$$

and $$\lambda_y(t,z) = \pm(-L_x(t,z) \sin \theta(z) + L_y(t,z) \cos \theta(z)) \tag{4b}$$

where the sign $(\pm)$ is the sign of $L_z(t_o,z)$.

This corresponds to a rotation of the horizontal axes of the multicomponent sonde 14 through an angle $\theta$. This process corrects for the twisting and random azimuthal orientation of the multicomponent sonde 14 by mathematically rotating the horizontal axes in such a way so as to simulate rotating each of the horizontal geophones to maximize the vector sum of the earth's response developed by the horizontal geophones.

One may be tempted to azimuthally orient the sonde 14 by maximizing the shear component of the earth's response from shear signals $\vec{T}(t,z)$; however, the validity of such an approach is predicated upon the assumption that the polarization of a downgoing shear wave remains fixed and is known. In general, this is not the case. Shear wave polarization splitting can occur as a result of azimuthally anisotropic media, which can cause the shear wave polarization to vary with depth. As such, the polarization splitting or birefringence phenomena invalidates such approach. The present invention does not make assumptions about the shear wave particle motion, thereby, allowing the particle motion to be subsequently analyzed. This ability is, in fact, crucial if information regarding shear wave and azimuthal anisotropy is to be extracted from the shear VSP data.

The second signals, $\vec{L}(t,z)$, representing the compressional component of the earth's response to the imparted seismic energy can be developed from the raw response signals $\vec{S}(t,z)$, as described above, and results of which are displayed in FIGS. 5A, B, and C. Since a projection of a compressional direct arrival in the horizontal plane, $(\vec{H}p)$, as displayed in FIGS. 2A and 2B, corresponds to the vector sum of the second response signals $L_x(t,z)$ and $L_y(t,z)$ for a particular depth within the well borehole. The direction vector $(\vec{H}p)$ can be used to determine the appropriate orientation angle of the horizontal geophones $(H_x, H_y)$ as shown above. Given the angle $\theta(z)$, the axis of the horizontal geophones $(H_x, H_y)$ can be mathematically aligned by a simple rotation matrix, thereby orienting the sonde with reference to a fixed direction with transformer 44.

Consequently, the shear signals $\vec{T}(t,z)$ can now be properly oriented using the rotation angle $\theta(z)$ obtained from the compressional signals $\vec{L}(t,z)$. The resulting rotated shear signals $\vec{T}(t,z)$ are:

$$\tau_x(t,z) = \pm(T_x(t,z) \cos \theta(z) + T_y(t,z) \sin \theta(z)) \tag{5a}$$

and $$\tau_y(t,z) = \pm(-T_x(t,z) \sin \theta(z) + T_y(t,z) \cos \theta(z)) \tag{5b}$$

where $T_z(t,z)$ = a response signal developed by a geophone having a vertical axis z;

$T_x(t,z)$ = a response signal developed by a geophone having a horizontal axis x;

$T_y(t,z)$ = a response signal developed by a geophone having a horizontal axis y; and the $(\pm)$ sign is the $(\pm)$ sign of $L_z(t_o,z)$.

Figure 6A:
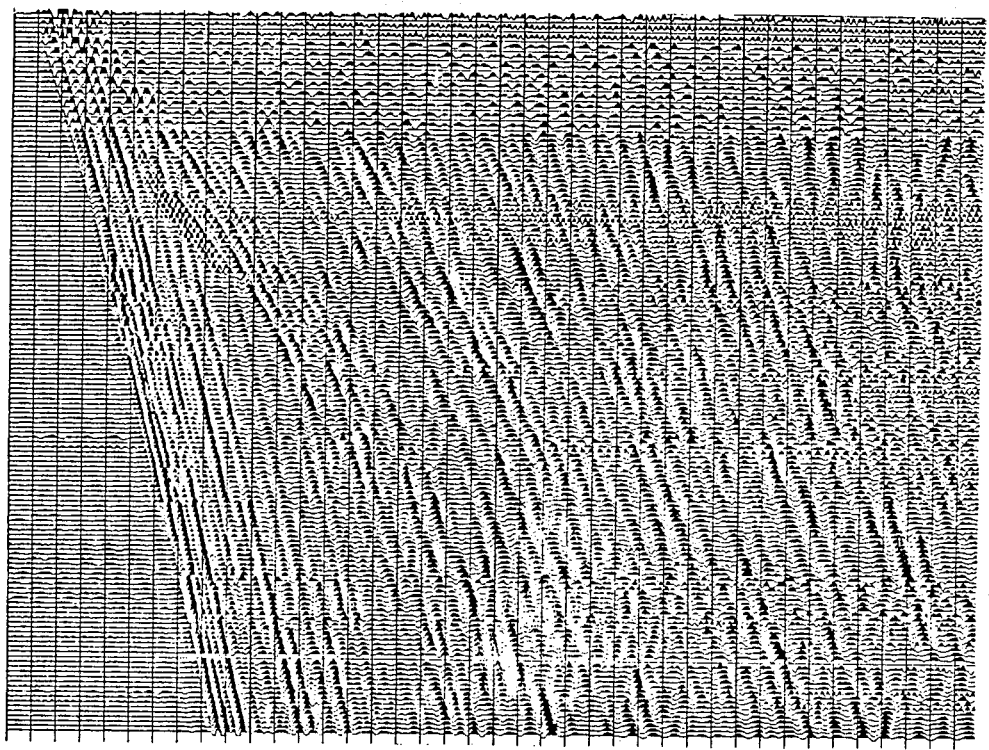
FIGS. 6A, B, and C are representations of the signals of FIG. 4 azimuthally oriented with respect to a fixed reference.
Figure 6B:
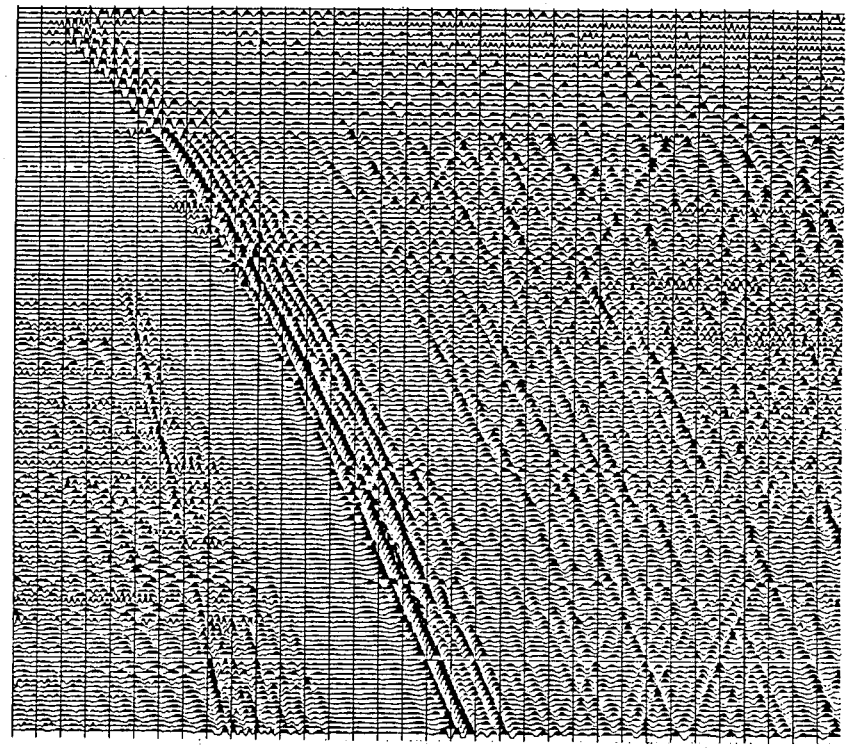
Figure 6C:
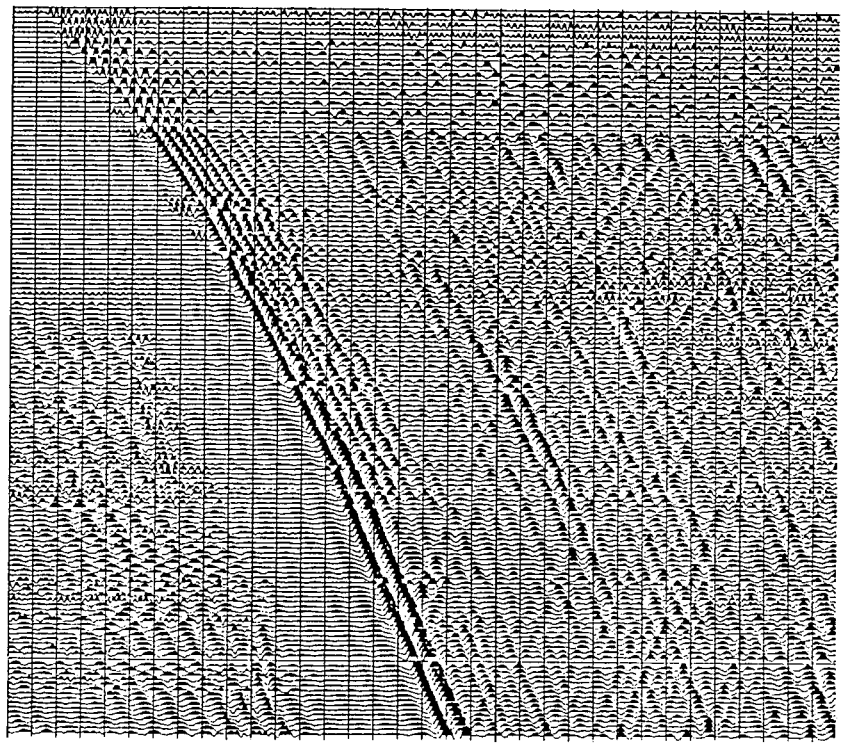

Once the appropriate angle $\theta(z)$ has been determined, both the shear and compressional VSP data displayed in FIGS. 4A, B and C and FIGS. 5A, 5B and 5C can be rotated through the angle $\theta(z)$ to a fixed reference frame to correct for the azimuthal twisting of the horizontal geophones of the multicomponent sonde and shear and compressional VSP displays 46 and 48 can thus be obtained. The results of this correction to the shear VSP data displayed in FIGS. 4A, B and C are shown in FIGS. 6A, B and C.

The new technique preserves the shear wave polarization information through the artifice of using independent information contained in the developed compressional wave VSP data to orient the sonde.

The invention has been described in detail. However, various other changes and modifications would suggest themselves to those skilled in the art and such changes or modifications are intended to fall within the scope of the invention as defined herein.

What is claimed is:

1. A method of vertical seismic profile exploration of the earth's subterranean formations surrounding a well borehole comprising the steps of:

(a) periodically imparting seismic energy into the earth's subterranean formations at or near the well borehole with a horizontally directed swept frequency vibrator, wherein the vibrator sweeps a band of frequencies according to a pilot sweep signal;

(b) traversing a region of interest in the well borehole with a multicomponent sonde having three geophones with linearly independent axes each developing a plurality of raw response signals representative of the earth's response to the periodically imparted seismic energy;

(c) forming a second harmonic of the pilot sweep signal; and (d) cross-correlating the raw response signals of each geophone with the second harmonic of the pilot sweep signal to obtain a plurality of first signals representative of a first component of the earth's response to the periodically imparted seismic energy.

2. The method of claim 1 further including the step of cross-correlating the raw response signals with a fundamental harmonic of the pilot sweep signal to obtain a plurality of second signals representative of a second component of the earth's response to the periodically imparted seismic energy.

3. The method of claim 2 further including the step of azimuthally aligning the geophones of the multicomponent sonde having horizontal axes with respect to a fixed reference frame.

4. The method of claim 3 wherein the step of aligning comprises:

(a) maximizing a vector sum of the first signals, within a time window $t_1 \to t_2$, developed by the geophones having horizontal axes according to:

$$R(t_o, z) = \max_{t_1 < t < t_2} [L_x^2(t,z) + L_y^2(t,z)]^{\frac{1}{2}}$$

where $L_x(t,z)$ = a first signal developed by a geophone having a horizontal axis x;

$L_y(t,z)$ = a first signal developed by a geophone having a horizontal axis y; and $t_o$ = time of maximum vector sum within the time window $t_1 \to t_2$;

(b) determining a rotation angle $\theta(z)$ to the fixed reference frame according to:

$$\theta(z) = \tan^{-1} \frac{L_y(t_o, z)}{L_x(t_o, z)}.$$

5. The method of claim 4 further including the steps of:

(a) forming rotated first signals providing compressional components of the earth's response to the imparted seismic energy according to:

$$\lambda_x(t,z) = \pm(L_x(t,z) \cos \theta(z) + L_y(t,z) \sin \theta(z))$$

and $$\lambda_y(t,z) = \pm(-L_x(t,z) \sin \theta(z) + L_y(t,z) \cos \theta(z))$$

where the ($\pm$) sign is the ($\pm$) sign of the first response signal $L_z(t_o,z)$ developed by a geophone having a vertical axis.

6. The method of claim 2 further including the step of plotting the second signals as shear VSP displays.

7. The method of claim 5 further including the step of plotting the rotated first signals as compressional VSP displays.

8. The method of claim 4 further including the steps of:

(a) forming rotated second signals providing unambiguous shear components of the earth's response to the imparted seismic energy according to:

$$\tau_x(t,z) = \pm(T_x(t,z) \cos \theta(z) + T_y(t,z) \sin \theta(z))$$

and $$\tau_y(t,z) = \pm(-T_x(t,z) \sin \theta(z) + T_y(t,z) \cos \theta(z))$$

where $T_z(t,z)$ = a second signal developed by a geophone having a vertical axis z;

$T_x(t,z)$ = a second signal developed by a geophone having a horizontal axis x;

$T_y(t,z)$ = a second signal developed by a geophone having a horizontal axis y; and the ($\pm$) sign is the ($\pm$) sign of the first response signal $L_z(t_o,z)$ developed by a geophone having a vertical axis.

9. A method of claim 8 further including the step of plotting the rotated second signals as shear VSP displays.

10. A method of vertical seismic profile exploration for extracting the shear and compressional components of the earth's response to seismic energy imparted into the earth with a horizontally directed swept frequency vibrator, comprising the steps of:

(a) periodically imparting seismic energy into the earth's subterranean formations at or near a well borehole with a horizontally directed swept frequency vibrator, wherein the swept frequency vibrator sweeps a band of frequencies according to a pilot sweep signal f(t);

(b) concurrently, traversing a region of interest in the well borehole with a multicomponent sonde having three geophones with orthogonal axes $(V_z, H_x, H_y)$ to develop a plurality of raw response signals $V_z(t,z)$, $H_x(t,z)$, and $H_y(t,z)$ representative of the earth's response to the periodically imparted seismic energy;

(c) cross-correlating the raw response signals $V_z(t,z)$, $H_x(t,z)$, and $H_y(t,z)$ of the three geophones with the pilot sweep signal f(t) to obtain shear component response signals $T_z(t,z)$, $T_x(t,z)$, and $T_y(t,z)$ representative of the shear measures of the earth's response to the imparted seismic energy;

(d) forming a second harmonic of the pilot sweep signal f(t); and (e) cross-correlating the raw response signals $V_z(t,z)$, $H_x(t,z)$, and $H_y(t,z)$ with the second harmonic of the pilot sweep signal f(t) to obtain compressional component response signals $L_z(t,z)$, $L_x(t,z)$, and $L_y(t,z)$ representative of the compressional measures of the earth's response to the imparted seismic energy.

11. The method of claim 10 further including the step of rotating the axes of the geophones having horizontal axes $(H_x, H_y)$ to a fixed reference frame to unravel ambiguous azimuthal orientation of the geophones having horizontal axes as the multicomponent sonde traverses regions of interest in the well borehole.

12. The method of claim 10 further including the step of plotting the shear component response signals as separate vertical seismic profile displays.

13. The method of claim 10 further including the step of plotting the compressional component response signals as separate vertical seismic profile displays.

14. The method of claim 9 wherein the step of rotating comprises:
(a) maximizing a vector sum of the compressional component response signals, within a time window $t_1 \rightarrow t_2$, developed by the geophones having horizontal axes according to:

$$R(t_o,z) = \max_{t_1 < t < t_2} [L_x^2(t,z) + L_y^2(t,z)]^{\frac{1}{2}}$$

where:
$L_x(t,z)$ = the compressional component response signal developed by a geophone having a horizontal axis x;
$L_y(t,z)$ = the compressional component response signal developed by a geophone having a horizontal axis y; and
$t_o$ = time of maximum vector sum within the time window $t_1 \rightarrow t_2$;
(b) determining a rotation angle $\theta(z)$ to the fixed reference frame according to:

$$\theta(z) = \tan^{-1}\frac{L_y(t_o,z)}{L_x(t_o,z)}.$$

15. The method of claim 14 further including the steps of:
(a) forming rotated shear component response signals providing unambiguous shear components of the earth's response to the imparted seismic energy according to:

$$\tau_x(t,z) = \pm(T_x(t,z)\cos\theta(z) + T_y(t,z)\sin\theta(z))$$

and $$\tau_y(t,z) = \pm(-T_x(t,z)\sin\theta(z) + T_y(t,z)\cos\theta(z))$$

where the ($\pm$) sign is the ($\pm$) sign of the response signal $L_z(t_o,z)$ developed by the geophone having a vertical axis.

16. The method of claim 15 further including the step of plotting the rotated shear component response signals as shear VSP displays.

17. A method of processing vertical seismic profile raw response signals developed by a multi-component sonde, having three geophones with orthogonal axes, to seismic energy imparted into the earth with a horizontally directed swept frequency vibrator, wherein the vibrator sweeps a band of frequencies according to a pilot sweep signal f(t), to extract shear and compressional components of the earth's response comprising the steps of:
(a) cross-correlating raw response signals $V_z(t,z)$, $H_x(t,z)$, and $H_y(t,z)$ of the three geophones with the pilot sweep signal f(t) to obtain shear component response signals $T_z(t,z)$, $T_x(t,z)$, and $T_y(t,z)$ representative of the shear components of the earth's response to the imparted seismic energy;
(b) forming a second harmonic of the pilot sweep signal f(t); and
(c) cross-correlating raw response signals $V_z(t,z)$, $H_x(t,z)$, and $H_y(t,z)$ with the second harmonic of the pilot sweep signal f(t) to obtain compressional component response signals $L_z(t,z)$, $L_x(t,z)$ and $L_y(t,z)$ representative of the compressional components of the earth's response to the imparted seismic energy.

18. The method of claim 17 further including the step of rotating the axes of the geophones having horizontal axes $(H_x,H_y)$ to a fixed reference frame to unravel ambiguous azimuthal orientation of the geophones having horizontal axes as the multicomponent sonde traverses regions of interest in the well borehole.

19. The method of claim 18 wherein the step of rotating comprising:
(a) maximizing a vector sum of the compressional compressional component response signals, within a time window $t_1 \rightarrow t_2$, developed by the geophones having horizontal axes according to:

$$R(t_o,z) = \max_{t_1 < t < t_2} [L_x^2(t,z) + L_y^2(t,z)]^{\frac{1}{2}}$$

where
$L_x(t,z)$ = the compressional component response signal developed by a geophone having a horizontal axis x;
$L_y(t,z)$ = the compressional component response signal developed by a geophone having a horizontal axis y; and
$t_o$ = time of maximum vector sum within the time window $t_1 \rightarrow t_2$;
(b) determining a rotation angle $\theta(z)$ to the fixed reference frame according to:

$$\theta(z) = \tan^{-1}\frac{L_y(t_o,z)}{L_x(t_o,z)}.$$

20. The method of claim 19 wherein the rotated compressional seismic signals comprise the following:

$$\lambda_x(t,z) = \pm(L_x(t,z)\cos\theta(z) + L_y(t,z)\sin\theta(z))$$

and $$\lambda_y(t,z) = \pm(-L_x(t,z)\sin\theta(z) + L_y(t,z)\cos\theta(z))$$

and the rotated shear seismic signals comprise the following:

$$\tau_x(t,z) = \pm(T_x(t,z)\cos\theta(z) + T_y(t,z)\sin\theta(z))$$

and $$\tau_y(t,z) = \pm(-T_x(t,z)\sin\theta(z) + T_y(t,z)\cos\theta(z))$$

where the ($\pm$) is the ($\pm$) sign of $L_z(t_o,z)$, the compressional component response signal developed by a geophone having a vertical axis z.

21. The method of claim 1 wherein the pilot sweep signal sweeps a band of frequencies $f_1(t_1)$ to $f_2(t_2)$ and the second harmonic of the pilot sweep signal sweeps a band of frequencies $2f_1(t_1)$ to $2f_2(t_2)$.

22. The method of claim 17 wherein the pilot sweep signal sweeps a band of frequencies $f_1(t_1)$ to $f_2(t_2)$ and the second harmonic of the pilot sweep signal sweeps a band of frequencies $2f_1(t_1)$ to $2f_2(t_2)$.

* * * * *